United States Patent [19]

Criblez

[11] 4,036,089
[45] July 19, 1977

[54] DEVICE FOR SHEARING ROD SECTIONS ON AN AUTOMATIC MULTI-STAGE CROSS-FED PRESS

[75] Inventor: Roger Criblez, Bottmingen, Switzerland

[73] Assignee: Hatebur Umformmaschinen AG, Basel, Switzerland

[21] Appl. No.: 695,302

[22] Filed: June 11, 1976

[30] Foreign Application Priority Data

June 12, 1975 Germany ............................ 2526151

[51] Int. Cl.² .......................................... B26D 1/02
[52] U.S. Cl. ..................................... 83/198; 83/618; 83/628; 173/123
[58] Field of Search ....................... 83/198, 628, 618; 173/123, 100

[56] References Cited

U.S. PATENT DOCUMENTS

| 2,926,557 | 3/1960 | Ford | 83/628 |
| 3,089,368 | 5/1963 | Cousino | 83/628 |
| 3,882,911 | 5/1975 | Pachmayr et al. | 144/136 J |
| 3,886,829 | 6/1975 | Criblez | 83/198 |

*Primary Examiner*—Donald R. Schran
*Attorney, Agent, or Firm*—Lowe, King, Price & Markva

[57] ABSTRACT

The assembly is for shearing rod sections with a movable cutter carriage carrying a shearing blade between a resting position and a shearing position. A reciprocating impact head is used to drive the cutter carriage. The impact head is moved into contact with an adjacent end of the cutter carriage to effect motion of the cutter carriage to the shearing position. The cutter carriage is biased toward the impact head and the resting position to effect the return stroke motion of the cutter carriage. The contact of the impact head with the adjacent end of the cutter carriage is broken on completion of the return stroke to draw the impact head a predetermined distance back to a starting position from which the impact head is ready to strike the adjacent end of the cutter carriage with considerable momentum upon the starting of the next shearing cycle.

7 Claims, 3 Drawing Figures

DEVICE FOR SHEARING ROD SECTIONS ON AN AUTOMATIC MULTI-STAGE CROSS-FED PRESS

BACKGROUND OF THE INVENTION

The invention relates to a device for shearing rod sections on an automatic multi-stage cross-fed press. More particularly, the press has a sliding cutter carriage carrying a shearing blade. The cutter cariage has a throughbore in the region of the shearing blade for the admission of the rod section to be sheared off. The cutter carriage is driven to excute a translational motion after introduction of the rod section thereby to shear off the rod section in cooperation with a stationary shearing blade.

Such a prior art device is disclosed in the German Pat. No. 2,322,770. However, this prior art device has the disadvantage that its construction is relatively intricate because of the necessary coupling of the cutter carriage to an impact carriage. Thus the prior art assembly is extremely expensive. Furthermore, due to the complicated construction, it is necessary to have an effective cooling system to remove heat generated when the device is operated continuously.

PURPOSE OF THE INVENTION

The primary object of the invention is to provide as assembly that is simple in construction, very reliable in operation and requires no cooling of any kind.

A further object of the invention is to provide an assembly which overcomes the disadvantages associated with the prior art mechanisms.

SUMMARY OF THE INVENTION

These objectives and other advantages are accomplished through the invention as disclosed and described herein. The assembly is used for shearing rod sections with a movable cutter carriage carrying a shearing blade between a resting position and a shearing position. The cutter carriage is driven by a reciprocating impact head. The motion of the impact head is controlled in such a way that it breaks contact with the adjacent end of the cutter edge upon completion of the return stroke. Thus, the impact head draws a predetermined distance back to a starting position from which the impact head is ready to strike the adjacent end of the cutter carriage with a considerable momentum. The cutter carriage is biased toward the impact head and toward the resting position to effect the return stroke motion of the cutter carriage.

In a specific embodiment, the impact head is disposed at the end of an impact lever which is positively driven by a cam means. The impact lever includes two arms positioned at an angle with respect to each other and each carrying a cam follower. Each cam follower is driven by a separate cam surface. The cam surfaces are designed to be effective to cause the impact head and cutter carriage to possess a negligibly low speed at the instant when the cutter carriage reaches the shearing end position remote from the bar stock. The impact head and cutter carriage return together to a resting position after the shearing process.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 3 is a diagram illustrating one possible operating sequence of the impact head and the cutter carriage.

DESCRIPTION OF SPECIFIC EMBODIMENTS

Figure 1:
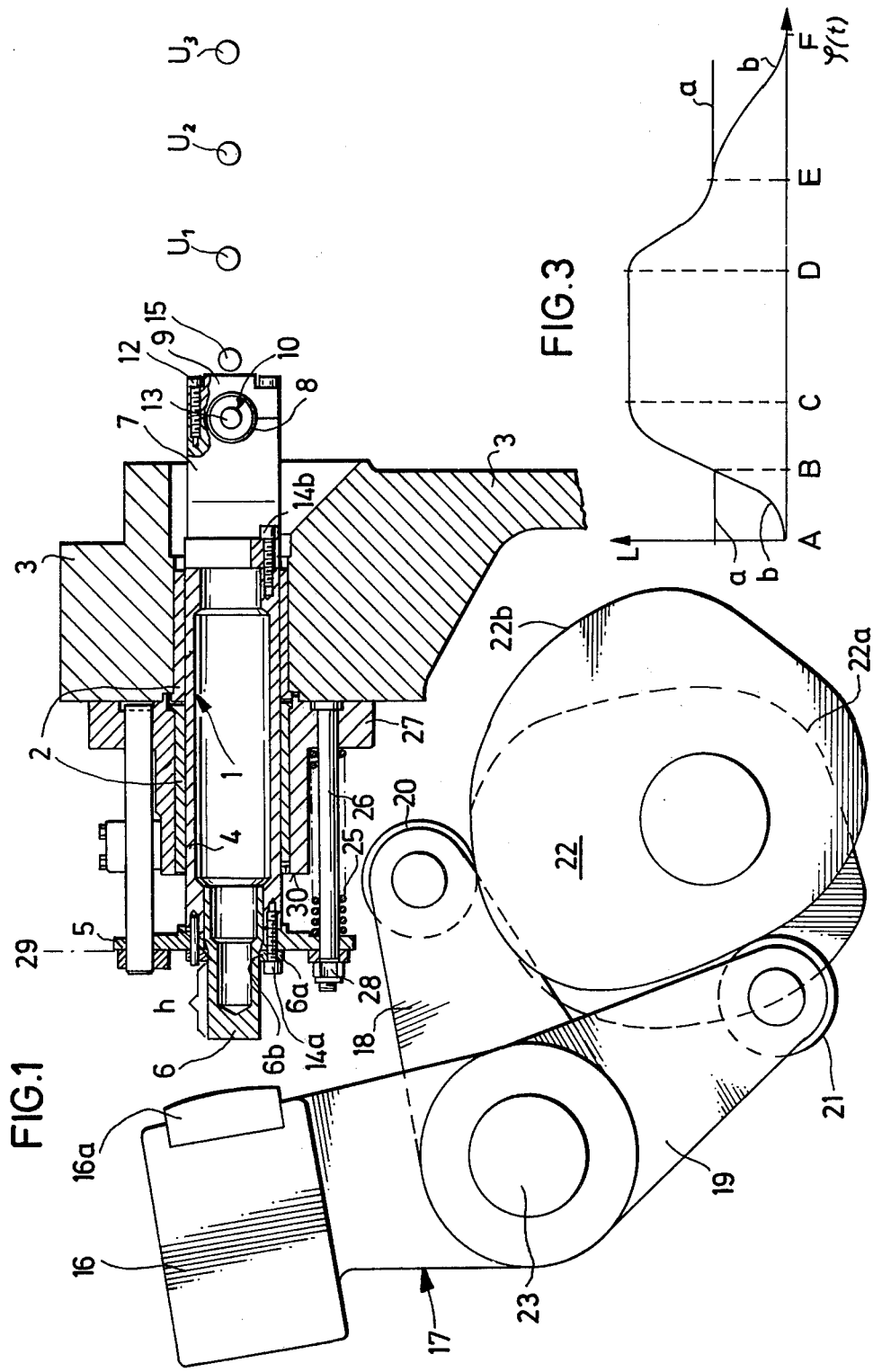
FIG. 1 is a vertical partial sectional view of a device for shearing rod sections on an automatic multi-stage cross-fed press.
Figure 2:
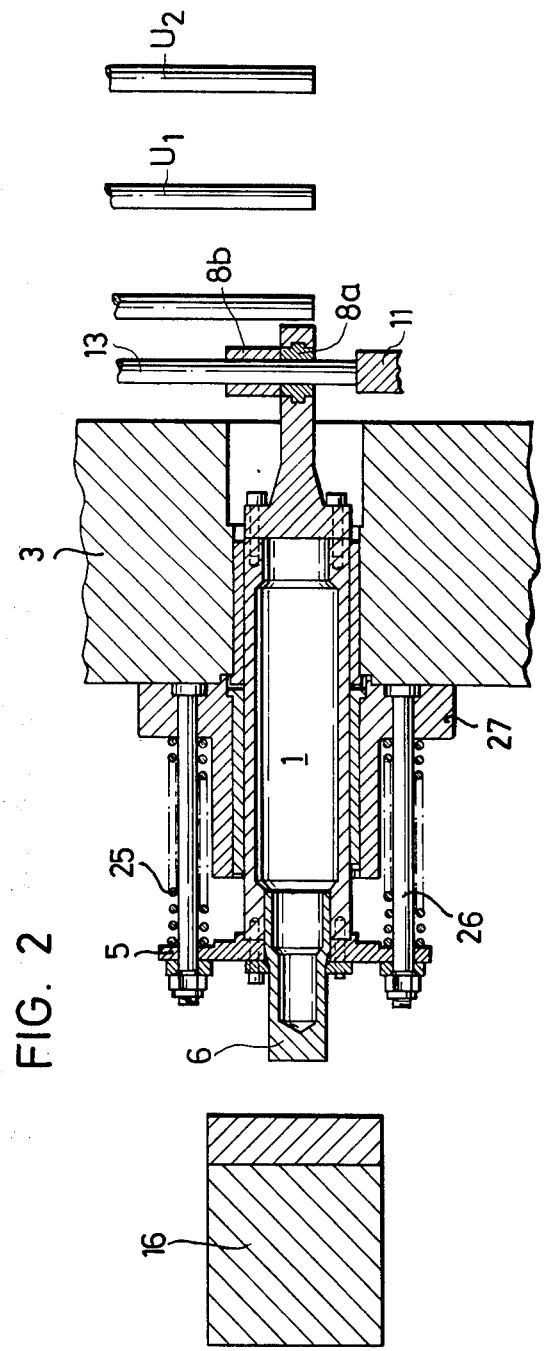
FIG. 2 is the associated horizontal sectional view of the device of FIG. 1.

The sections in FIGS. 1 and 2 are simplified in places and show a cutter carriage, generally designated 1. Cutter carriage 1 is slidably mounted in guide sleeves 2 of the press housing 3. Cutter carriage 1 comprises the carriage body 4, an annular flange 5 and a breaker 6 at one end of the carriage body 4 and a shearing blade holder 7 at the other end thereof. The annular flange 5 is disposed on the end of the cutter carriage 1 nearest the impact head 16. A moving shearing blade 8 (FIG. 1) is held in blade holder 7. A holder cover 9 is attached to the front end of shearing blade holder 7 by bolts 12. Thus, the shearing blade 8 can be removed. The breaker 6 and the shearing blade holder 7 are attached to the body 4 of the carriage by bolts 14a and 14b, respectively.

In the position shown in FIGS. 1 and 2, the cutter carriage 1 is at the intake station where the rod section 13 is to be sheared off. Rod section 13 is pushed through a throughbore 10 in the cutter carriage 1 and up against a fixed stop 11. After having been sheared off, rod section 13 is situated at the loading station 15 where it is pushed into the waiting arms of a pair of tongs and conveyed to the first forming station U1. The mechanism for effecting the conveying of the sheared rod sections to the forming stations is described in an earlier patent and does not form a part of the invention of the present application.

During the shearing process, rod section 13 is therefore situated in the throughbore 10 and is sheared off by the motion of the moving shearing blade 8a (FIG. 2) relative to a stationary shearing blade 8b located beside it. Of particular importance in this shearing operation is that the moving shearing blade 8a (FIG. 2) impinges on the rod section 13 at maximum possible speed. Experience has shown that this gives a clean plane of shear and avoids any undesirable deformation of the rod section 13.

The impact head 16 is completely separate from and drives the cutter carriage 1 thereby achieving the high speed necessary at the beginning of the shearing process. Impact head 16 has a specially hard insert 16a and is fixed to the upper end of a striking lever 17. Lever 17 includes two rigid arms 18 and 19 having rollers 20 and 21, respectively, which follow the driving surfaces 22a and 22b of a double cam 22.

The two driving surfaces 22a and 22b of the cam 22 are designed to effectively rock the impact head 16 back and forth about the fixed axis 23. Head 16 strikes breaker 6 each time it rocks back and forth, thus, a very high acceleration is imparted to the whole cutter carriage 1.

Helical springs 25 lie round the shafts of guide bolts 26 and press against a flanged bush 27 at one end and the annular flange 5 at the other to return cutter carriage 1. During the return movement, springs 25 maintain cutter carriage 1, as much as possible, in contact with the face of the impact head insert 16a. Thus, undesirable rebound effects are eliminated. The series of helical springs in compression constitute biasing means to effect the return stroke of cutter carriage 1. Annular flange 5 provides a spring plate for the series of springs 5.

The heads of the guide bolts 26 are anchored in throughbores in the flanged bush 27. The free ends of bolts 26 carry locked stop nuts 28 which act as the stop for the annular flange 5. The annular flange 5 slides on the guide bolts 26 between plane 29 and the stop face 30. Thus, the path of motion of flange 5 is limited by stops 28 and 30 defining a resting end position and a shearing end position, respectively. The guide bolts 26 are mounted adjacent to path to movement for the cutter carriage 1. Stops 28 are on the impact head side of the annular flange 5 and helical springs 25 are on the other side of the annular flange 5.

The motion of impact head 16 and cutter carriage 1 may proceed as shown in FIG. 3. The distance covered is plotted in the y-direction and the cam angle $p$ (representing time 5) plotted along the x-axis. The motion of cutter carriage 1 is given by curve (a), that of the impact head by curve (b). The two curves coincide over the section B-E.

Starting with impact head 16 in the position shown in FIG. 1, which position corresponds to time A in FIG. 3, impact head 16 is first accelerated over the period A-B. Head 16 strikes cutter carriage 1 at time B and carries carriage 1 along with it. In veiw of the enormous momentum of cutter carriage 1, the rod section 13 is sheared off substantially at time B. On completion of the shearing process, impact head 16 and cutter carriage 1 continue to travel together during the time period B-E, being held in the far end position during the period C-D due to the shape of cam 22. At this end position, the sheared off rod sectin 13 is ejected into the open arms of the waiting pair of grippers.

When rod section 13 has left the bore 10 in the shearing blade 8, the return run of impact head 16 and cutter carriage 1 can begin. During its return, impact head 16 is moved back positively by the cam 22. The strong springs 25 maintain the end of the breaker 6 in contact with insert 16a of impact head 16 during the whole of the return run. When the annular flange 5 strikes the stop nuts 28 at time E, the common speed of impact head 16 and cutter carriage 1 is negligibly small. Thus, the impact stresses which occur are minimal. When cutter carriage 1 reaches the end position of FIG. 1, impact head 16 retracts further thereby preparing for the next impact.

Breaker 6 is located at the impact head end of the cutter carriage 1 and is shaped like a hollow cylinder. Breaker 6 has the function of protecting the mechanical parts should they meet an unforeseen resistance such as a rod which is too hard. For this purpose, retaining flange 6a of breaker 6 has an attenuated and hence weaker section 6b effective to break under a predetermined minimal load. The length (h) of the part of the breaker projecting beyond this attenuated section 6b is so dimensioned that, if the impact head 16 destroys breaker 6, it cannot reach cutter carriage 1 and the drive is therefore interrupted. That is, the drive link between impact head 16 and cutter carriage 1 is broken.

It is possible to use a cam with a single driving surface instead of using the double cam 22 to drive the impact lever 17 positively. The impact lever 17 would in this case only have one follower 20 or 21, but would be biased by a strong spring.

While the device for shearing rod sections on an automatic multi-stage cross-fed press has been shown and described in detail, it is obvious that this invention is not to be considered as being limited to the exact form disclosed, and that changes in detail and construction may be made therein, within the scope of the invention, without departing from the spirit thereof.

Having thus set forth and disclosed the nature of this invention, what is claimed is:

1. An assembly for shearing rod sections with a movable cutter carriage carrying a shearing blade between a resting position and a shearing position, said assembly comprising:
   a. a reciprocating impact head carried at one end of an impact lever for driving the cutter carriage,
   b. means for moving the impact head into contact with an adjacent end of the cutter carriage to effect motion of the cutter carriage to the shearing position,
   c. means for biasing the cutter carriage toward the impact head and the resting position to effect the return stroke motion of the cutter carriage, and
   d. said biasing means includes at least one elastic element which provides a continuous biasing force,
   e. means for breaking contact of the impact head with the adjacent end of the cutter carriage on completion of the return stroke to draw the impact head a predetermined distance back to a starting position from which the impact head is ready to strike said adjacent end of the cutter carriage with considerable momentum upon activation of said moving means.

2. An assembly as defined in claim 1 wherein said moving means include the cam means for positively driving said lever.

3. An assembly as defined i claim 2 wherein said impact lever includes two arms positioned at an angle with respect to each other and each having a cam follower,
said cam means including two separate cam surfaces, each cam follower following a different one of said cam surfaces,
said cam surfaces being effective to cause the impact head and the cutter carriage to possess a negligibly low speed at the instant when the cutter carriage reaches its shearing end position remote from the rod stock.

4. An assembly for shearing rod sections with a movable cutter carriage carrying a shearing blade between a resting position and a shearing position, said assembly comprising:
   a. a reciprocating impact head for driving the cutter carriage,
   b. means for moving the impact head into contact with an adjacent end of the cutter carriage to effect motion of the cutter carriage to the shearing position,
   c. means for biasing the cutter carriage toward the impact head and the resting position to effect the return stroke motion of the cutter carriage, and
   d. means for breaking contact of the impact head with the adjacent end of the cutter carriage on completion of the return stroke to draw the impact head a predetermined distance back to a starting position from which the impact head is ready to strike said adjacent end of the cutter carriage with considerably momentum upon activation of said moving means, e. an annular flange being disposed on the end of the cutter carriage nearest the impact head,
f. the path of motion of said annular flange being limited by stops defining a resting end position and a shearing end position,
g. said biasing means comprises a series of helical springs in compression to effect the return stroke of the cutter carriage,
h. said annular flange providing a spring plate for said series of springs.

5. An assembly as defined in claim 4 wherein
guide bolts having elongated shafts are mounted adjacent the path of movement for the cutter carriage, said shafts fixably carry stops on the impact head side of said annular flange and carry the helical springs on the other side of the annular flange.

6. An assembly as defined in claim 1 wherein
a breaker means having an attenuated, weaker section is located at the impact head end of the cutter carriage,
said weaker section being effective to break under a predetermined minimum load.

7. An assembly as defined in claim 6 wherein
the breaker means has a portion that projects away from the carriage toward the impact head by a length that is so dimensioned that if the breaker means is destroyed, the drive link between the impact head and cutter carriage is broken.

* * * * *